United States Patent
Schulmeyr et al.

(10) Patent No.: US 8,557,185 B2
(45) Date of Patent: Oct. 15, 2013

(54) PRESSURE VESSEL ARRANGEMENT COMPRISING AN EXTERNAL PRESSURE VESSEL AND AT LEAST ONE INSERT BASKET

(75) Inventors: Josef Schulmeyr, Wolnzach (DE); Stefan Geyer, Wolnzach (DE); Manfred Gehrig, Wolnzach (DE)

(73) Assignee: NATECO2 GmbH & Co. KG, Wolnzach (DE)

( * ) Notice: Subject to any disclaimer, the term of this patent is extended or adjusted under 35 U.S.C. 154(b) by 967 days.

(21) Appl. No.: 12/545,254

(22) Filed: Aug. 21, 2009

(65) Prior Publication Data

US 2010/0047135 A1 Feb. 25, 2010

(30) Foreign Application Priority Data

Aug. 21, 2008 (DE) .................... 10 2008 039 106

(51) Int. Cl.
*B01J 3/04* (2006.01)

(52) U.S. Cl.
USPC ............ 422/112; 422/261; 422/297

(58) Field of Classification Search
USPC ............ 422/261, 292, 295, 112, 297
See application file for complete search history.

(56) References Cited

U.S. PATENT DOCUMENTS

| 3,478,423 | A | 11/1969 | Jagersberger |
| 5,355,901 | A | 10/1994 | Mielnik et al. |
| 5,377,705 | A | 1/1995 | Smith, Jr. et al. |
| 5,730,286 | A * | 3/1998 | Eska ................. 206/315.9 |
| 6,712,081 | B1 * | 3/2004 | Uehara et al. ........... 134/105 |
| 7,322,280 | B2 | 1/2008 | Seurat Guiochet |
| 2006/0201221 | A1 | 9/2006 | Sehlstedt |
| 2007/0009635 | A1 | 1/2007 | Voisin |

FOREIGN PATENT DOCUMENTS

| DE | 3542646 A1 | 6/1987 |
| DE | 69920715 T2 | 10/2005 |
| DE | 602004007222 T2 | 2/2008 |
| DE | 60317467 T2 | 10/2008 |
| EP | 0061877 A2 | 10/1982 |
| EP | 1792542 A1 | 6/2007 |

* cited by examiner

*Primary Examiner* — Sean E Conley
(74) *Attorney, Agent, or Firm* — Browdy and Neimark, PLLC

(57) ABSTRACT

A pressure vessel arrangement comprises an external pressure vessel and at least one insert basket in the pressure vessel for receiving a substance to be treated which is exposable to a pressure fluid which is feedable to the pressure vessel and the insert basket. There is provided a control device for the internal pressure prevailing in the insert basket, in particular in the form of a switchable pressure compensation line connecting the interior of the insert basket directly to the surroundings, i.e. not via the pressure vessel.

8 Claims, 1 Drawing Sheet

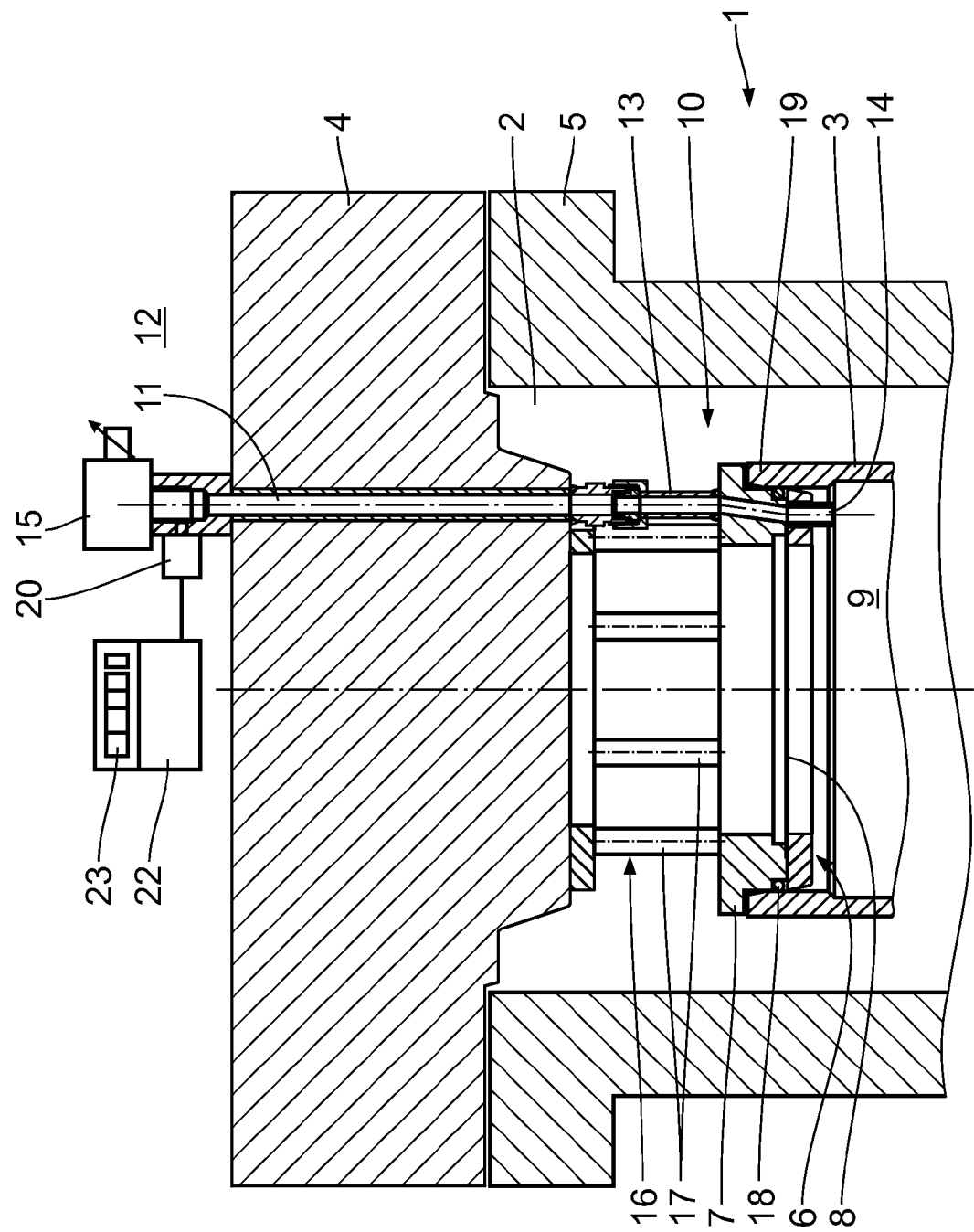

PRESSURE VESSEL ARRANGEMENT COMPRISING AN EXTERNAL PRESSURE VESSEL AND AT LEAST ONE INSERT BASKET

BACKGROUND OF THE INVENTION

1. Field of the Invention

The invention relates to a pressure vessel arrangement which comprises an external pressure vessel and at least one insert basket arranged therein for receiving a substance to be treated. Said substance is exposable to a pressure fluid which is feedable to the pressure vessel and the insert basket.

2. Background Art

With respect to the background of the invention, it shall be noted that the invention is primarily relevant when treating solids with liquids and/or gases. The substance to be treated is filled into a pressure vessel which needs to withstand the pressures and temperatures required for treatment.

'Treatment' in this context refers to mechanical or thermal separation or cleaning processes. Examples thereof include filtering, elutriation, extraction or adsorption.

The substances to be treated may be directly filled into the vessels and removed therefrom in a suitable manner once the process is finished. The processes of filling and emptying are simple if the solid is flowable prior to and after treatment.

A plurality of fasteners such as so-called quick-release fasteners have been developed for faster filling and emptying. In the field of high-pressure application engineering, the so-called quick-action clamp has become common standard for vessels with smaller diameters. Clamps for vessels with larger diameters would become too heavy; therefore, other designs such as the 'Brettschneider' fastener have been developed.

It is common practice as well, in particular when using smaller vessels, to use insert baskets. The advantages thereof need to be weighed against the respective production costs:

Filling and emptying may be performed outside the pressure vessel. Advantages are particularly evident when using explosive dusts and vapors. The same applies in the processing of solids where careful attention has to be paid to the hygienic conditions. Due to these operating limitations, it may be mandatory to use baskets.

A purely economic advantage is that a plurality of insert baskets can be prepared at suitable times so that they only need to be exchanged during the mostly understaffed night shifts, for example.

The solid provided in the insert baskets can be flown through (axially) from the bottom to the top or vice versa in the longitudinal direction of the vessel but also from the outside to the inside and vice versa (radially). The second mode of operation is particularly advantageous if slow flow rates are desired, for instance during adsorption.

In the following, the term 'treatment' refers more specifically to the extraction of solids using liquid or supercritical gases. Carbon dioxide is preferably used. The invention is however by no means limited to this application.

The typical extraction procedure is described using the example of hops.

Prior to extraction, hops are cleaned to remove heavy particles before being coarsely ground and pressed into pellets. Once cooled down, pellets are weighed and filled into flexible containers. These containers are transported to the respective extraction installation, the pellets are filled into the pressure vessel directly but may also be filled into insert baskets.

Extraction takes place in the same way in all installations. The solvent flows through the bed of hops pellets at high pressure so as to be loaded with the significant components of the hops. In the following separation step, the previously dissolved components are separated from the solvent and discharged form the pressure vessel. Extraction of the pellets occurs in batches as the pressure in the respective vessel needs to be reduced to atmospheric pressure when removing and filling in the pellets.

When the pressure in the pressure vessel is reduced to atmospheric pressure, this leads to serious problems as far as the vessel fasteners and insert baskets are concerned. The pressure vessels (extraction and separation vessels) are equipped with quick-release fasteners. A two-component clamp is used to secure the vessel lid to the vessel. A seal prevents the escape of gas. In order to open the lid, the two clamp halves need to be moved apart in a first step. The lid may then be lifted hydraulically or pneumatically and moved to the side.

The clamps can only be removed if pressure measuring devices at the top and the bottom of the vessel indicate that the vessel is no longer under pressure. Then a valve ('bleed valve') needs to be opened so as to exhaust gas, which may still be contained in the vessel, to the atmosphere. This process needs to be monitored by the operator. The escape of gas, which is audible or visible for instance by means of an inflated bellows, guarantees that the line is not clogged. This valve needs to be open for some time before the clamp may be unlocked.

An insert basket consists of a tube having flanges at the top and at the bottom, with screens and support plates being clamped therein. In order for the $CO_2$ solvent to flow through the basket, a seal is disposed on the outside for sealing the basket towards the extractor so as to prevent the $CO_2$ solvent from passing into the region between basket and extractor and thus past the substance to be extracted. The insert basket is not subject to mandatory testing.

When using baskets, safety problems may arise if the screen plates become clogged. In such a case, the internal volume of the basket is cut off from the surrounding volume in the vessel; as described above, however, the absence of an internal pressure is only determined on the basis of the pressure measurement inside the volume of the vessel. When the screen plates are clogged it may therefore occur that attempts are being made to open the quick-release fastener although the pressure relief has only occurred in the vessel.

If it has been possible for the clamps and the lid to be opened successfully, an unknown internal pressure remains in the insert basket. The insert basket then acts as a pressurized pressure vessel. The pressure can be relieved by releasing the flanges of the insert basket. If screw flanges are used, a targeted relief of pressure can be performed. In any case, there is always a certain surprise effect as the remaining pressure in the basket might have gone unnoticed.

If the pressure is however relieved via a defect in the basket, this may be extremely harmful to be operator. If for instance the lower bottom flange breaks away when the basket is still in the vessel, this may have a rocket-like effect on the basket, resulting in a behavior of the basket which is similar to that of a pressurized gas cylinder when a valve breaks away.

Similar effects must be expected if the basket bursts while being removed from the vessel.

These potential risks can be avoided if provisions have been made to prevent the screens from becoming clogged so that the internal pressure in the insert basket is always equal to that in the vessel. This can be achieved by not filling pasty substances into the insert baskets. Many years of practical application have shown that screen plates do not become clogged by bulky or powdery materials, especially if the mesh width of the screen plates is large enough.

It may however be necessary to use extremely fine filters instead of the screen plates so as to prevent an entrainment of sludge. Likewise, it may be desired to further investigate the extraction of pasty materials for new product developments.

In this case, measures need to be taken in order to avoid the above-discussed risks whenever there is a differential pressure between insert basket and vessel. For instance, the insert baskets may be provided with predetermined rupture points such as safety valves and rupture discs. It must however be ensured that devices of this type are practically applicable as well, i.e. an early rupture thereof must be avoided. In other words, they must not challenge the success of the extraction process. As a result, the desired pressures would be so high that hazards caused by an internal pressure cannot be excluded. Another huge uncertainty factor is that the mentioned devices may become clogged, thus giving a false effect of safety.

SUMMARY OF THE INVENTION

Starting from the described safety problems, it is the object of the invention to improve a pressure vessel arrangement in such a way as to reliably ensure that a pressure relief in the insert basket takes place before the pressure vessel is opened.

This object is generally achieved by the constructional measure of providing a control device for the internal pressure prevailing in the insert basket.

According to preferred embodiments, this can be achieved in various constructional ways. For instance, a pressure compensation line may generally be provided to serve as a control device for the internal pressure, which pressure compensation line connects the insert basket to the surroundings of the pressure vessel arrangement directly, i.e. not via the pressure vessel, and is switchable correspondingly so as to ensure hermetic sealing during operation and a safe relief of the internal pressure from the insert basket before the pressure vessel arrangement is opened.

A simpler alternative is to design the control device as a pressure compensation line which is only provided between the inside of the insert basket and the pressure vessel surrounding said basket. In this case, a dangerous internal pressure in the insert basket can be excluded as well if no pressure has been detected in the actual pressure vessel by the safety measures described at the outset before the pressure vessel arrangement is opened.

Another alternative or an additional measure for controlling the internal pressure prevailing in the insert basket is to determine said internal pressure by means of a corresponding pressure measuring device and to display the prevailing internal pressure outside the pressure vessel arrangement in the usual way. This allows a dangerous pressure difference between insert basket and pressure vessel to be detected externally.

In order to ensure a high operational safety of the pressure compensation line between the insert basket and the surroundings of the pressure vessel arrangement, it is intended according to another preferred embodiment for the vessel lid to be rigidly connected to the basket lid so as to be mounted and demounted together when the vessel is loaded. This avoids the problem that when the insert basket is sealed using a separate basket lid before attaching the pressure compensation line, it is impossible to check whether this line is still intact even after closing the vessel lid, thus giving the operator only a sense of pseudo safety. According to the preferred embodiment, this problem is solved by the combined component comprising the vessel lid and the basket lid, with a pressure compensation line being permanently passed through said component.

Further features, details and advantages of the invention will become evident from the ensuing description where an embodiment of the subject matter of the invention is explained in more detail by means of the enclosed drawing.

BRIEF DESCRIPTION OF THE DRAWING

FIG. 1 shows a partial section through a pressure vessel arrangement in the region of a vessel lid.

DESCRIPTION OF THE PREFERRED EMBODIMENTS

The drawing shows a pressure vessel, the whole arrangement being denoted by 1, which can be provided with an insert basket 3 via a loading opening 2, with only the upper collar of the insert basket 3 being shown. This insert basket 3 may for instance be loaded with hops which are extracted in a conventional extraction process using supercritical carbon dioxide.

The loading opening 2 must be hermetically sealed using a vessel lid 4. To this end, a flange 5 is provided which surrounds the loading opening 2 of the pressure vessel 1 and is flange-connected to the vessel lid 4 by means of quick-action clamps not shown in more detail in a pressure-resistant fashion.

The insert basket 3 is sealed by means of a basket lid 6 which comprises an annular, peripheral lid flange 7 and a sealing screen 8 clamped therein. Via said sealing screen 8, supercritical carbon dioxide passed through the insert basket 3 may escape from said insert basket 3, said carbon dioxide being introduced into the insert basket 3 at the foot end thereof (not shown in the drawing) via a corresponding bottom screen.

It is evident that when the sealing screen 8 and the bottom screen (not shown) are clogged, an excess pressure may remain in the interior 9 of the insert basket 3 even if the vessel space 10 of the pressure vessel 1 surrounding the insert basket 3 is pressure-relieved. This results in the safety problems described in detail at the outset.

In order to eliminate these problems, a control device for the internal pressure prevailing in the interior 9 of the insert basket 3 is provided which will be explained in more detail below. In the embodiment shown in the drawing, the control device primarily consists of a pressure compensation line 11 which extends from the surroundings 12 of the pressure vessel 1 through the vessel lid 4 via a rigid connector 13 before passing through the lid flange 7 to a nozzle 14 and into the interior 9 of the insert basket 3. At the outer end of the pressure compensation line 11 is arranged a valve 15 which is opened in a controlled fashion after relieving the pressure in the pressure vessel 1. In this way, an excess pressure still prevailing in the interior 9 of the insert basket 3 can be exhausted to atmosphere, thus ensuring a safe removal of the insert basket 3 after opening the vessel lid 4.

The drawing further shows that the basket lid 6 is rigidly connected to the vessel lid 4 via a bridge portion 16 comprising a number of connecting links 17 extending towards the vessel lid 4, with pressure compensation line 11 included therebetween. Between the connecting links 17, the bridge portion 16 is open for the supercritical carbon dioxide to pass through. When the pressure vessel 1 is loaded, the upwardly open insert basket 3 holding a corresponding load of substances to be extracted is inserted into the pressure vessel 1 in a first step before attaching the vessel lid 4 together with the basket lid 6 from above. When this happens, the peripheral annular seal 18 of the lid flange 7 engages into the opening collar 19 of the insert basket 3, thus sealing the perimeter of the insert lid 6 against the insert basket 3.

When the pressure vessel 1 is opened after an extraction process, the pressure vessel 1 is pressure-relieved, the valve 15 is opened, and the entire vessel lid 4 is lifted up again together with the insert lid 6 after removal of the quick-action clamps. It is evident that there is no risk under any circumstances of opening the vessel while the interior 9 of the insert basket 3 is still under pressure.

The enclosed drawing further indicates another control device for the pressure in the interior 9 of the insert basket 3. Said control device is a pressure sensor 20 which is integrated in the feed line to the valve 15 via an intermediate piece. This sensor measures the pressure in the interior 9 of the insert basket 3 indirectly via the pressure in the pressure compensation line 11. Just like the signals of all other pressure sensors not shown in more detail, the sensor signal may be processed by means of an evaluation device 22 and displayed on a display unit 23. As mentioned above, this allows a dangerous pressure state to be detected in the insert basket 3.

Finally it shall be noted that the pressure compensation line 11 may also be provided with a simple plug instead of the valve 15, which plug is screwable to said pressure compensation line 11 in a controlled fashion. When the plug is screwed off, a bar or a wire can be used to check the pressure compensation line 11 for obstructions; this must be performed with all due caution. If the wire probe can easily be pushed through the entire pressure compensation line 11, it can be assumed with reasonable certainty that the interior 9 of the insert basket 3 is connected to the surroundings 12 in such a way as to allow a corresponding pressure compensation to take place.

In the very unlikely event that there is still a certain amount of internal pressure in the insert basket 3, the insert basket 3 will be retained in the vessel even if the vessel lid 4 is opened. When the vessel lid 4 is opened, the basket lid 6 is opened as well, causing said insert basket 3 to be pressed into the vessel by the propulsion jet of a gas under residual pressure.

What is claimed is:

1. A pressure vessel arrangement comprising:
   an external pressure vessel (1) and
   at least one insert basket (3) in the pressure vessel (1) for receiving a substance to be treated which is exposable to a pressure fluid which is feedable to the pressure vessel (1) and the insert basket (3), and
   a control device (11, 20) for the internal pressure prevailing in the insert basket (3), wherein the control device comprises a switchable pressure compensation line (11) connecting the interior (9) of the insert basket (3) to the surroundings (12) directly and not via the pressure vessel (1), wherein the pressure vessel (1) is provided with a vessel lid (4) and the insert basket (3) is provided with a basket lid (6), wherein the pressure compensation line (11) is passed through the vessel lid (4) and the basket lid (6) and, wherein the pressure compensation line (11) is passed through a flange (7) holding a sealing screen (8) of the basket lid (6).

2. A pressure vessel arrangement according to claim 1, wherein the vessel lid (4) and the basket lid (6) are rigidly connected to each other so as to be mounted and demounted together when the vessel is loaded.

3. A pressure vessel arrangement according to claim 1, wherein the basket lid (6) is connected to the vessel lid (4) via an open bridge portion (16) allowing a passage of pressure fluid.

4. A pressure vessel arrangement according to claim 1, wherein the switchable pressure compensation line (11) comprises one of the group comprising a plug and a valve (15) as switching device.

5. A pressure vessel arrangement according to claim 1, wherein the control device is formed by a pressure measuring device (20) which detects the pressure in the insert basket (3).

6. A pressure vessel arrangement according to claim 1, wherein the control device further includes a pressure measuring device (20) which detects the pressure in the insert basket (3), with the pressure measuring device (20) detecting the pressure in the pressure compensation line (11).

7. A pressure vessel arrangement according to claim 1, wherein the pressure vessel (1) is designed such that the substance to be treated is exposable to a pressurized fluid.

8. A pressure vessel arrangement according to claim 1, wherein the pressure vessel (1) is designed such that the substance to be treated is exposable to one of the group comprising a liquid and a supercritical gas.

\* \* \* \* \*